United States Patent
Dalton

(10) Patent No.: US 8,537,240 B2
(45) Date of Patent: Sep. 17, 2013

(54) WHITE BALANCE CORRECTION IN A CAPTURED DIGITAL IMAGE

(75) Inventor: Dan L. Dalton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,099

(22) PCT Filed: Sep. 29, 2009

(86) PCT No.: PCT/US2009/058828
§ 371 (c)(1),
(2), (4) Date: Jan. 25, 2012

(87) PCT Pub. No.: WO2011/040906
PCT Pub. Date: Apr. 7, 2011

(65) Prior Publication Data
US 2012/0147213 A1    Jun. 14, 2012

(51) Int. Cl.
*H04N 9/73*  (2006.01)

(52) U.S. Cl.
USPC .......................................................... 348/223.1

(58) Field of Classification Search
USPC .......................................................... 348/223
See application file for complete search history.

(56) References Cited

U.S. PATENT DOCUMENTS

| 8,013,907 B2* | 9/2011 | Kuang et al. ............... 348/223.1 |
| 2004/0212696 A1 | 10/2004 | Tsugita et al. |
| 2006/0092171 A1* | 5/2006 | Zhang .......................... 345/589 |
| 2008/0198240 A1 | 8/2008 | Duncan et al. |
| 2009/0141975 A1* | 6/2009 | Li ............................... 348/223.1 |
| 2009/0147098 A1* | 6/2009 | Li ............................... 348/223.1 |

FOREIGN PATENT DOCUMENTS

JP    2003-324744 A    11/2003

OTHER PUBLICATIONS

International Preliminary Report on Patentability, International Application No. PCT/US2009/058828, Date of Mailing: Apr. 12, 2012, pp. 1-6.
International Search Report and Written Opinion, International Application No. PCT/US2009/058828, Date of Mailing: Jun. 18, 2010, pp. 1-11.

* cited by examiner

*Primary Examiner* — James M Hannett
*Assistant Examiner* — Padma Haliyur

(57) ABSTRACT

A method for correcting white balance in a captured digital image includes storing raw sensor data representative of the captured digital image in a memory and normalizing the raw sensor data by applying an illuminant-independent shading and vignetting correction to the raw sensor data. The method continues with applying a plurality of illuminant-dependent shading and vignetting correction masks to the raw sensor data and comparing the illuminant-dependent shading and vignetting correction result with the illuminant-independent shading and vignetting correction result.

15 Claims, 2 Drawing Sheets

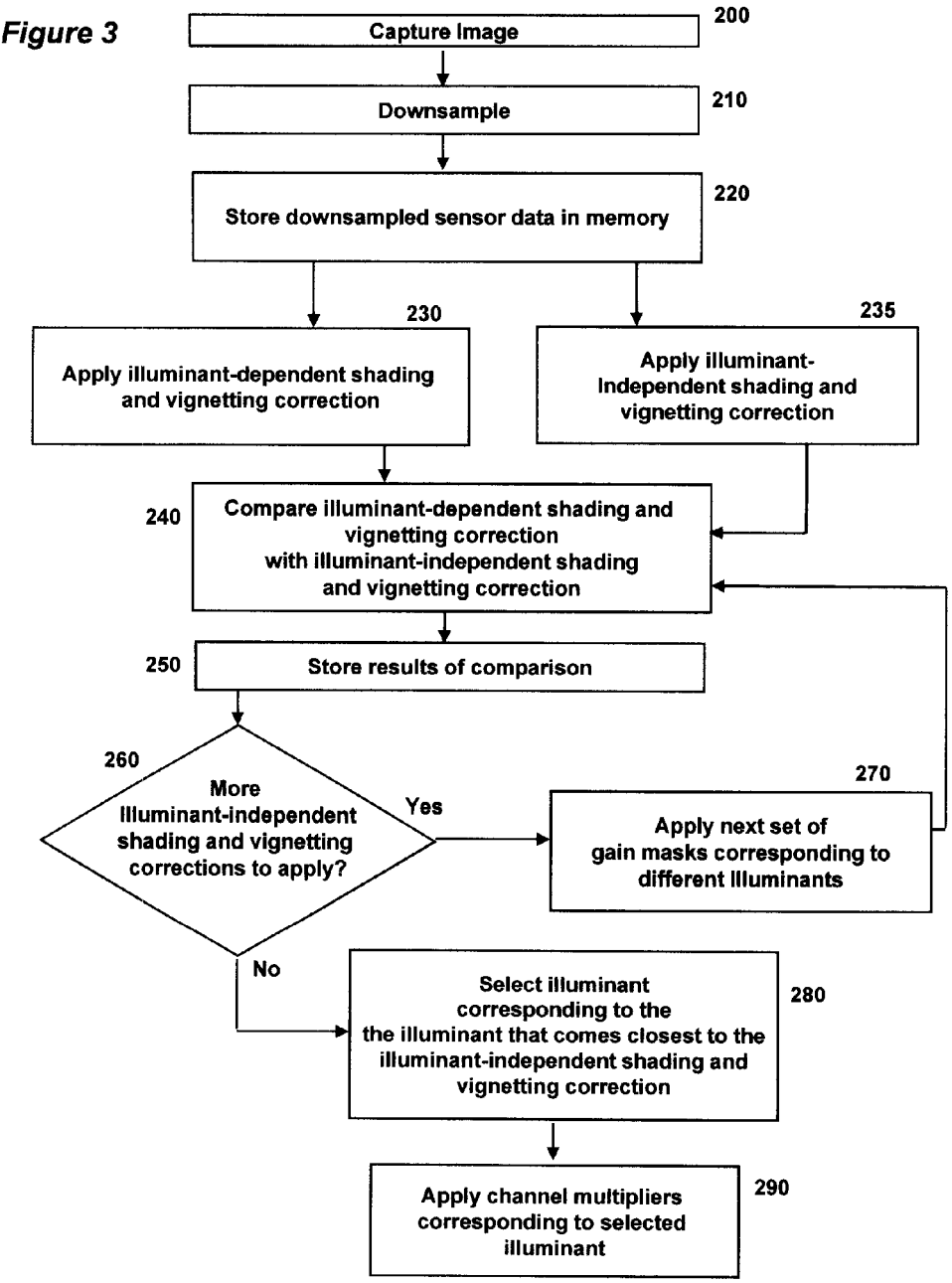

WHITE BALANCE CORRECTION IN A CAPTURED DIGITAL IMAGE

BACKGROUND

In a digital camera or camera phone, color corrections must often be applied to the captured image so that the image truly and accurately reproduces the scene. In some instances, especially when the digital camera or camera phone makes use of a relatively small imaging sensor that is separated from the lens by only a few millimeters, the large angles between the center axis of the lens and the edges of the imaging sensor can cause shading and vignetting around the periphery of the sensor array, thus requiring substantial image processing to compensate for such imperfections in the captured image.

Under other circumstances, such as when capturing images under varying Illuminants, which might include tungsten lamps, fluorescent light sources, daylight, and so forth, some level of image processing is also required in order to correctly set the "white balance" point. If the white balance point is not correctly set, the resulting image can appear unnatural by having an inordinate amount of red, blue, yellow, or other color present in the image.

BRIEF DESCRIPTION OF THE DRAWINGS

FIG. 3 is a flowchart for determining the proper white balance in a captured image according to an embodiment of the invention.

DESCRIPTION OF THE EMBODIMENTS

As digital imaging devices continue to evolve from digital cameras to cellular camera phones and "webcams", and to even smaller image-capture devices, sensor and lens geometries of the components used in these devices continue to shrink in size. As the size of these components continues to be reduced, image processing techniques must be employed to correct for vignetting and color shading present in the captured image. To complicate matters, when a variety of Illuminants might be used to illuminate the captured scene, illuminant-dependent color shading and vignetting may additionally be introduced into the captured image. These artifacts must be corrected in order to produce an image that accurately portrays the captured scene.

The inventor of the invention set forth in the appended claims has determined that an illuminant-independent shading and vignetting correction, when compared with an illuminant-dependent shading and vignetting correction, can be used to guide the imaging device toward selecting the correct illuminant used to illuminate the captured scene. When the correct illuminant is selected, the correct setting for the white balance point of the captured image can be selected. When the white balance of the resulting image is correctly set, the image is likely to more accurately represent the colors present in the captured scene.

Figure 1:
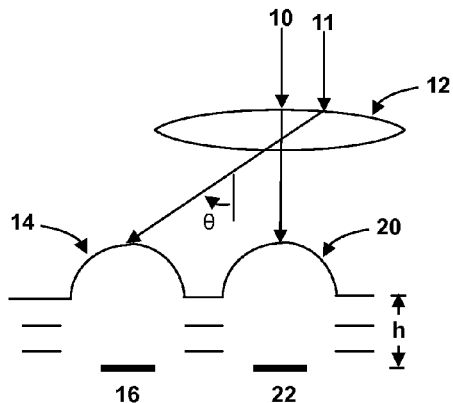
FIG. 1 shows an exemplary portion of an imaging sensor array in which embodiments of the invention may be practiced.

FIG. 1 shows an exemplary portion of an imaging sensor array in which embodiments of the invention may be practiced. Although only two exemplary micro lenses and two imaging sensors are shown in the Figure, the inventor of the claimed invention contemplates that at least some embodiments of the invention would include perhaps millions or tens of millions of micro lenses and a corresponding number of imaging sensors in the imaging sensor array.

In FIG. 1, light rays 10 and 11 are incident upon lens 12. As the light rays are focused by lens 12, light ray 10 is incident upon micro lens 20 while light ray 11 is incident upon micro lens 14. In the embodiment of FIG. 1, micro lenses 14 and 20 represent a portion of an imaging sensor array that lies below lens 12. Lying directly below micro lens 14 is imaging sensor 16, and lying directly below micro lens 20 is imaging sensor 22.

Each imaging sensor, such as those illustrated in FIG. 1, can be thought of as possessing a cup-like structure in which the photoelectric converter portion of the imaging sensor lies at the base of the cup, and each cup is separated from the micro lens by at least a height "h". Accordingly, given the geometry of FIG. 1, it can be appreciated that when light rays 10 and 11 are focused by lens 12, a lesser amount of light is present at the sensors at the periphery of the sensor array as a function of the angle θ (theta). In other words, as angle θ assumes values closer to 0°, a larger quantity of light will be present at sensors lying directly below lens 12.

Further, when lens 12 incorporates an infrared "cut" (or "IR cut") filter, the filter may cause the imaging sensor array to exhibit a color-dependent filtering characteristic as a function of angle θ. Thus, directly beneath the center of lens 12, light at infrared wavelengths (only) is excluded. However, as angle θ increases, additional wavelengths (such as wavelengths in the visible light spectrum) may also be excluded. Accordingly, at least in this sense, lens 12 can be considered a "spatially dependent optical band pass filter" in that as angle θ increases, a larger amount of light at visible wavelengths (in addition to infrared light) is not conveyed from lens 12 to the imaging sensor array. This brings about additional color-shading across the sensor as angle θ increases.

The phenomenon of color shading in an imaging sensor array brings about the need for color shading correction in optical sensors such as the optical sensor exemplified in FIG. 1. In optical sensors, such as those discussed herein, color-shading correction might be used to increase the gain of imaging sensors at the periphery of the imaging sensor array. In the example of FIG. 1, the inventor contemplates that exemplary sensors 16 and 22 are Bayer sensors, which include alternating patterns (2×2) of red and green sensors on a first line, and alternating patterns of green and blue sensors on a second line (that is a "Bayer pixel block"). In this example, blue sensors towards the periphery of the imaging array may undergo a greater gain multiplication factor than the factor used near the center of the imaging array.

In one embodiment of the invention, the illuminant-independent shading and vignetting correction method that is applied to each output of the imaging array of FIG. 1 is a spatially-varying 4×4 color correction matrix that is used to normalize the output of each pixel in the array. In some embodiments of the invention, millions, or perhaps tens of millions of pixels in the imaging array are corrected through the use of such a color correction matrix. In an embodiment of the invention, the color correction matrix for a given sensor location may be expressed as:

$$\begin{bmatrix} R_{corr} \\ Gr_{corr} \\ Gb_{corr} \\ B_{corr} \end{bmatrix} = \begin{bmatrix} K00 & K01 & K02 & K03 \\ K10 & K11 & K12 & K13 \\ K20 & K21 & K22 & K23 \\ K30 & K31 & K32 & K33 \end{bmatrix} \begin{bmatrix} R_{sensor} \\ Gr_{sensor} \\ Gb_{sensor} \\ B_{sensor} \end{bmatrix}$$

The scalar constants within the above color correction matrix change continuously as the matrix is moved across the image and are applied to each 2×2 Bayer pixel block to compensate for the spatially varying color shading and vignetting characteristics of the optical system. The above-identified color correction matrix can be said to be "illuminant-independent" because the matrix corrects for color shading and vignetting in any image regardless of the illuminant. In this embodiment of the invention, the output of the sensor array is color corrected by way of the spatially varying 4×4 color correction matrix above, and the normalized outputs are stored in memory. In some embodiments of the invention, perhaps only an 80×60 array that represents a portion of the imaging sensor array is sampled and the normalized outputs are stored. In other embodiments of the invention, a greater or lesser number of outputs is stored according to the memory and processing capability of the particular image processing device.

The illuminant-dependent shading and vignetting correction method applied to each output of the imaging array of FIG. 1 consists of a spatially-varying gain mask for each channel of the Bayer sensor of the imaging sensor array. The inventor contemplates that the spatially-varying gain values indicate the gain to be applied to each input pixel. For a four-channel raw Bayer image, four gain masks are conventionally used (one red, two green, and one blue). This method can be said to be "illuminant-dependent" since a unique set of gain masks are required for each illuminant. If a gain mask generated for one illuminant is used to correct an image for which a different illuminant has been used, color shading will likely be visible in the resulting corrected image.

In an embodiment of the invention, the illuminant-dependent color correction for a given sensor location may be expressed as:

$R_{corr(x,y)} = KR_{illum(x,y)} * R_{sensor(x,y)}$ $Gr_{corr(x,y)} = KGr_{illum(x,y)} * Gr_{sensor(x,y)}$ $Gb_{corr(x,y)} = KGb_{illum(x,y)} * Gb_{sensor(x,y)}$ $B_{corr(x,y)} = KB_{illum(x,y)} * B_{sensor(x,y)}$ Referring again to FIG. 1, it has been noted that the visible light filtering (in addition to the filtering light of infrared wavelengths) of lens 12 becomes more significant as angle θ increases. Accordingly, the inventor contemplates that to compensate for the dependency of the visible light filtering as a function of angle θ, an illuminant-independent feature of shading and vignetting correction should be performed to enhance the quality of the captured digital image. Further, in the embodiment of FIG. 1, an illuminant-independent calibration of the imaging sensor array is performed as well as an illuminant-dependent calibration for perhaps as many as 15 Illuminants or more (such as 7500, 6500, 5500, 5000, 4500, 4000° K. and others).

Figure 2:
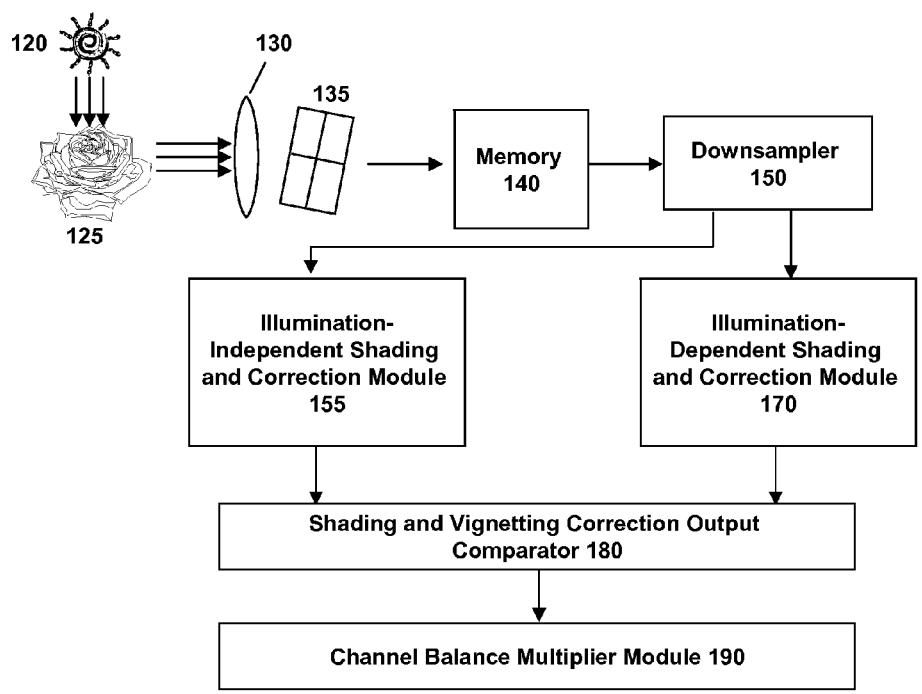
FIG. 2 is a block diagram for a digital imaging module for correcting white balance in a captured image according to an embodiment of the invention.

FIG. 2 is a block diagram for a digital imaging module for correcting white balance in a captured image according to an embodiment of the invention. In FIG. 2, illuminant 120 illuminates scene 125. Illuminant 120 is representative of solar radiation at a particular color temperature but may just as well represent solar radiation at any other temperature as well as representing a fluorescent illuminant, an incandescent illuminant, and so forth. But regardless of the illuminant, energy from that illuminant is reflected from scene 125 and focused by way of lens 130 onto imaging sensor array 135. Imaging sensor array 135 collects a substantial amount of the optical energy by way of perhaps millions or tens of millions of pixels that convert the received optical energy of certain wavelengths into electrical charges.

The raw data from imaging sensor array 135 is stored in memory 140. Coupled to memory 140 is downsampler 150, which serves to obtain a downsampled version of the raw data outputs from imaging sensor array 135. The purpose of downsampler 150 is to reduce the amount of memory required to interpret the color content of the captured scene. In some embodiments of the invention, downsampler 150 may sample a matrix of less than 5% of the pixels in the imaging sensor array. In other embodiments of the invention, a greater or lesser number of pixels may be sampled.

Illumination-independent shading and vignetting correction module 155, serves to normalize the outputs from imaging sensor array 135 as conveyed by way of memory 140. Outputs from illumination-independent shading and vignetting correction module 155 are conveyed to 180.

In the context of the embodiments of the invention as described herein, the term "normalizing" implies that the outputs from each sensor of imaging sensor array 135 are adjusted or calibrated so that the spectral response of a sensor in a particular color plane at a particular location of the imaging sensor array matches the spectral response of other sensors at other locations in the color plane. Thus, as an example, a sensor located at the periphery of imaging sensor array 135 should have its output adjusted upward to compensate for vignetting or other loss of signal in order to match the output of other sensors in the same color plane located towards the center of imaging sensor array 135.

Also coupled to the output of downsampler 150 is illuminant-dependent shading and vignetting correction module 170, which corrects the image for one of the 15 illuminants for which calibration data is available. At shading and vignetting correction output comparator 180, the image corrected with illuminant-independent correction 155 is compared to the image corrected with illuminant-dependent correction 170. Shading and vignetting correction output comparator 180 then generates an error score, such as a sum of the squares of the differences for each pixel that describes how closely the illuminant-dependent correction matches the illuminant-independent correction. Illuminant-dependent shading and vignetting correction module 170 may then correct the raw image for different illuminants, resulting in a different error score being calculated by shading and vignetting correction output comparator 180 for those illuminants. This process of applying illuminant-dependent correction, comparing the selected output with the illuminant-independent correction, and subsequently evaluating the deviations between the two continues until the calibrated illuminant with the lowest error score is determined.

The shading and vignetting corrected output may then be conveyed to channel balance multiplier module 190. The channel multipliers corresponding to the illuminant resulting in the lowest error score are then applied to each channel of the shading and vignetting corrected image to correct white balance. The channel multipliers can be applied after shading and vignetting correction, but these multipliers can also be incorporated into each illuminant-independent 4×4 correction matrix or into the illuminant-dependent shading and vignetting gain masks.

In the event that it is desired to determine the illuminant with finer precision, an interpolation may be made by a processor (not shown in FIG. 2) using two or more illuminant-dependent correction masks. In an embodiment of the invention, the interpolation includes creating a new illumination-dependent correction mask by interpolating between illumination-dependent masks that result in the smallest differences between the interpolated illumination-dependent correction mask and the illumination-independent correction 155. When the best illumination-dependent correction has been determined, the illuminant corresponding to the best illumination-dependent correction can be used to set the proper white balance point.

FIG. 3 is a flowchart for determining the proper white balance in a captured image according to an embodiment of the invention. Although FIG. 2 is capable of executing the method of FIG. 3, the method may be executed by alternative software/hardware architectures. The method of FIG. 3 begins at step 200 in which an image is captured. At step 210, the raw sensor output is downsampled and stored in memory (as in step 220). Although the method of FIG. 3 includes downsampling and storage steps 210 and 220, many embodiments of the invention may not include these steps.

Turning now to step 230 an illuminant-dependent shading and vignetting correction is applied to the downsampled raw sensor data stored in memory in step 220. At step 235 illuminant-independent shading and vignetting correction is applied to the downsampled raw sensor data. The method continues at step 240 in which the output of the illuminant-independent shading and vignetting correction (of step 235) is compared with the illuminant-dependent shading and vignetting correction (of step 230). The results of this comparison may be stored in memory, as in step 250.

At step 260, a determination is made as to whether or not more shading and vignetting correction masks need to be applied to the downsampled output. If, indeed, more illuminant-dependent shading and vignetting corrections need to be compared, step 270 is performed in which the next set of gain masks corresponding to a different illuminant is applied to the downsampled raw sensor data. The method then proceeds back to step 240, in which the illuminant-dependent shading and vignetting correction of step 270 is compared to the illuminant-independent shading and vignetting correction of step 235.

If the decision of step 260 indicates that there are no more shading and vignetting correction masks to compare with the downsampled output of the illuminant-independent shading and vignetting correction, step 280 is performed in which the illuminant corresponding to the mask that comes closest to (or approximates) the color corrected output of the sensor is selected.

After the illuminant for a scene has been determined, as in step 280, the channel multipliers corresponding to that illuminant can be applied to each channel of the shading and vignetting corrected image to correct white balance (step 290). The goal of white balance being to ensure that the colors in a scene appear the same regardless of the scene illuminant. Typically the channel multipliers are applied after shading and vignetting correction, but these multipliers can also be incorporated into each illuminant-independent 4×4 correction matrix or into the illuminant-dependent shading and vignetting gain masks.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for correcting white balance in a captured digital image, comprising the steps of:
    storing raw sensor data representative of the captured digital image in a memory, the raw sensor data collected by an imaging sensor array;
    normalizing the raw sensor data by applying illuminant-independent shading and vignetting correction to the raw sensor data, including applying a spatially-varying color-correction matrix to the raw sensor data;
    applying a plurality of illuminant-dependent shading and vignetting correction gain masks to the raw sensor data, each illuminant-dependent shading and vignetting correction gain mask including a spatially-varying gain mask for a respective color channel of the imaging sensor array;
    comparing the illuminant-dependent shading and vignetting correction result with the illuminant-independent shading and vignetting correction result; and
    selecting and applying the illuminant-dependent shading and vignetting correction gain mask that best approximates the normalized raw sensor data.

2. The method of claim 1, wherein the normalizing step further comprises the step of downsampling the raw sensor data for a plurality of color channels at different spatial locations on the imaging sensor array.

3. The method of claim 2, wherein the downsampling step further comprises applying a spatial low pass filter to at least some elements of the imaging sensor array to remove high frequency variations in the raw sensor data.

4. The method of claim 1, wherein the normalizing step includes applying a 4×4 color-correction matrix at different spatial locations of the imaging sensor array, wherein coefficients of the 4×4 color-correction matrix vary across the different spatial locations of the imaging sensor array.

5. The method of claim 1, wherein the normalizing step further comprises adjusting a spectral response of a sensor at a particular location in a particular color plane of the imaging sensor array to match a spectral response of other sensors at other locations in the particular color plane of the imaging sensor array.

6. The method of claim 1, wherein the comparing step includes generating an error score as a sum of squared differences between the illuminant-dependent shading and vignetting correction result and the illuminant-independent shading and vignetting correction result for each pixel of the captured digital image.

7. The method of claim 1, wherein the selecting and applying step includes interpolating between two illuminant-dependent shading and vignetting correction gain masks that appear close to the normalized raw sensor data.

8. The method of claim 1, wherein the raw sensor data is downsampled prior to the storing step.

9. A digital imaging module for correcting white balance in a captured image, comprising:

module for storing raw sensor data that represents a captured image into a memory, the raw sensor data collected by an imaging sensor array;

module for applying a spatially-varying illuminant-independent shading and vignetting color-correction transform to the raw sensor data to normalize output of the imaging sensor array;

module for applying at least one of a plurality of illuminant-dependent shading and vignetting color-correction masks to the raw sensor data, each illuminant-dependent shading and vignetting color-correction mask including a spatially-varying mask for a respective color channel of the imaging sensor array;

module for determining a difference between output of the illuminant-dependent shading and vignetting color-correction masks and the normalized output of the imaging sensor array;

module for selecting and applying the illuminant-dependent shading and vignetting color-correction mask that best approximates the normalized output of the imaging sensor array.

10. The digital imaging module of claim 9, wherein the module for applying the spatially-varying illuminant-independent shading and vignetting color-correction transform includes logic for applying a spatially-varying 4×4 color-correction matrix to the raw sensor data.

11. The digital imaging module of claim 9, further comprising:

module for generating an error score as a sum of squared differences between the illuminant-dependent shading and vignetting correction outputs and the normalized output of the imaging sensor array, wherein selecting the illuminant-dependent shading and vignetting color-correction mask includes selecting the illuminant-dependent shading and vignetting color-correction mask with a lowest error score.

12. The digital imaging module of claim 9, wherein the module for applying a spatially-varying illuminant-independent shading and vignetting color-correction transform to the raw sensor data includes adjusting a spectral response of a sensor at a particular location in a particular color plane of the imaging sensor array to match a spectral response of other sensors at other locations in the particular color plane of the imaging sensor array.

13. A digital imaging device, comprising:

an imaging sensor array to capture a digital image; and a processor to produce an output from the imaging sensor array, the processor to apply a plurality of illuminant-dependent shading and vignetting color-correction masks to the output from the imaging sensor array, and the processor to select an illuminant-dependent shading and vignetting color-correction mask based on a difference between illuminant-independent shading and vignetting color-correction output from the imaging sensor array and output from one of the plurality of illuminant-dependent shading and vignetting color-correction masks that best approximates the illumination-independent color-correction output, the illuminant-independent shading and vignetting color-correction output resulting from a spatially-varying color-correction matrix applied to the output from the imaging sensor array, and each illuminant-dependent shading and vignetting color-correction mask including a spatially-varying gain mask for a respective color channel of the imaging sensor array.

14. The digital imaging device of claim 13, wherein the processor additionally applies white balance correction factors based on a selected illuminant.

15. The digital imaging device of claim 13, wherein the processor additionally interpolates between two illuminant-dependent shading and vignetting color-correction masks that appear close to the illumination-independent color-correction output.

* * * * *